United States Patent [19]
Ohnishi et al.

[11] 3,886,363
[45] May 27, 1975

[54] SPECTRO FLUORESCENCE AND ABSORPTION MEASURING INSTRUMENT

[75] Inventors: Yasushi Ohnishi; Masamichi Tsukada, both of Katsuta, Japan

[73] Assignee: Hitachi, Ltd., Japan

[22] Filed: Jan. 17, 1974

[21] Appl. No.: 434,236

[30] Foreign Application Priority Data
Jan. 20, 1973 Japan.................................. 48-8958

[52] U.S. Cl................. 250/364; 250/365; 250/461; 356/98
[51] Int. Cl. ......................................... G01n 21/26
[58] Field of Search .......... 250/364, 365, 432, 461, 250/302; 356/97, 98

[56] References Cited
UNITED STATES PATENTS
2,971,429  2/1961  Howerton.......................... 250/365

OTHER PUBLICATIONS

A New Concept in Fluorometry, the SPF-125, American Instrument Co. Inc., Silver Spring, Md., December, 1968.

*Primary Examiner*—James W. Lawrence
*Assistant Examiner*—Davis L. Willis
*Attorney, Agent, or Firm*—Craig & Antonelli

[57] ABSTRACT

A spectrophotofluorometer capable of selectively performing photometry of one of a plurality of secondary lights such as fluorescence, phosphorescence and the like simultaneously emitted from a specimen due to the exciting light from a light source depending on the life time of the secondary light.

13 Claims, 8 Drawing Figures

SPECTRO FLUORESCENCE AND ABSORPTION MEASURING INSTRUMENT

The present invention relates to a spectrophotofluorometer, and more particularly to a spectrophotofluorometer capable of selectively measuring absorbed light, fluorescence or phosphorescence of a specimen with a single manipulation.

Generally a spectrophotofluorometer is such an instrument as performing qualitative and quantitative analysis of a material by measuring the spectrum of exciting light and that of fluorescence emitted thereby. However, when it is desired to measure phosphorescence with such an instrument, there is an important problem that the sample chamber of the photometer must be equipped with a rotary chopper for cutting off fluorescence as an attachment each time measurement is performed.

Also, when it is necessary to measure the lifetime of phosphorescence which is ordinarily of the order of milli-second, the additional cumbersome procedures are necessary in addition to the above-described manipulation that the decay or extinction curve of the phosphorescence is displayed on a synchroscope or the like and the displayed extinction curve is photographed.

Further, it was not so desirable to perform ordinary absorption photometry or fluorometry with the above-described instrument which in many cases is a single beam system. This is because in both cases the influence of the light source and the solvent which dissolves the material to be measured often cause an error in the result of measurement. Moreover, since the spectroscope ordinarily used in the above instrument is up to a so-called double monochromator, the measurable absorbancy is at most about 5 to 6 and the measurement of higher absorbancies is impossible.

An object of the present invention is to provide a spectrophotofluorometer capable of selectively performing photometry of a plurality of secondary lights emitted by a specimen due to exciting light from a light source by the use of their physical and chemical properties with a single manipulation.

Another object of the present invention is to provide a spectrophotofluorometer capable of recording the lifetime of phosphorescence of the order of milli-second with a single manipulation.

A further object of the present invention is to provide a spectrophotofluorometer capable of completely eliminating the influence of the light source and solvent on the measurement and capable of measuring up to absorbancy 8.

According to the present invention there is provided a spectrophotofluorometer comprising means for exciting light, a specimen placed at a position to which the exciting light from said means is directed, and means for selectively performing photometry of one of a plurality of secondary lights emitted by said specimen due to said exciting light depending on their physical and chemical properties or characteristics.

The above and other objects, features and advantages of the present invention will become more apparent from the following detailed description of the preferred embodiments of the present invention made by way of example only when taken in conjunction with the accompanying drawings, in which.

Figure 2:
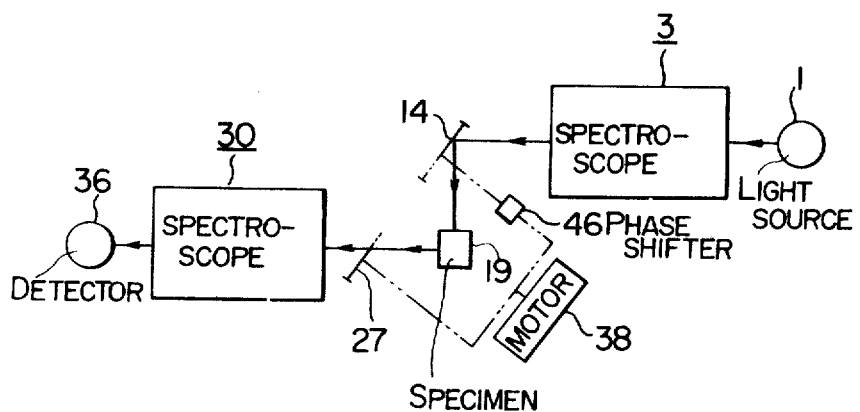
FIG. 2 is a block diagram of an embodiment of the present invention.
Figure 3:
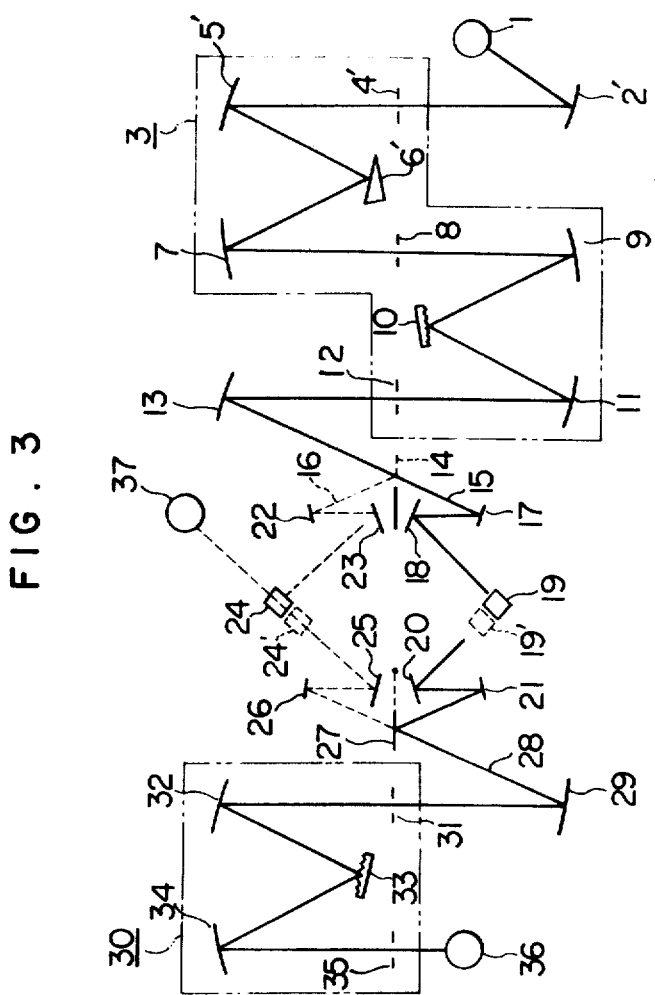
FIG. 3 is a schematic diagram of the optical system of another embodiment of the present invention.
Figure 4:
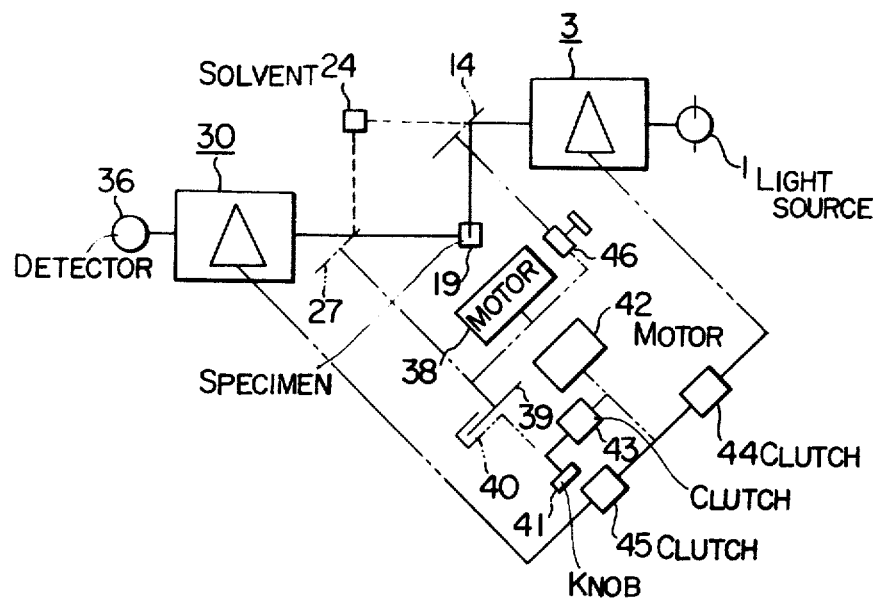
FIG. 4 is a block diagram of the embodiment of FIG. 3 including an internal driving system.
Figure 5A:
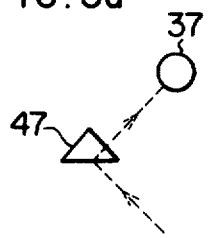
Figure 5B:
Figure 6A:
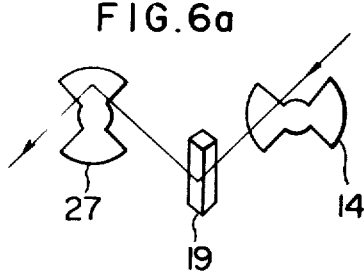
Figure 6B:
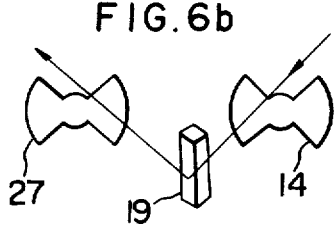

FIGS. 5a and 5b are an example of the disposition of the cell and the mirror, respectively, on the reference side in the optical system of FIG. 3; and FIGS. 6a and 6b are diagrams for explaining the rotary phase relationship between the two choppers shown in FIGS. 2, 3 and 4.

Figure 1:
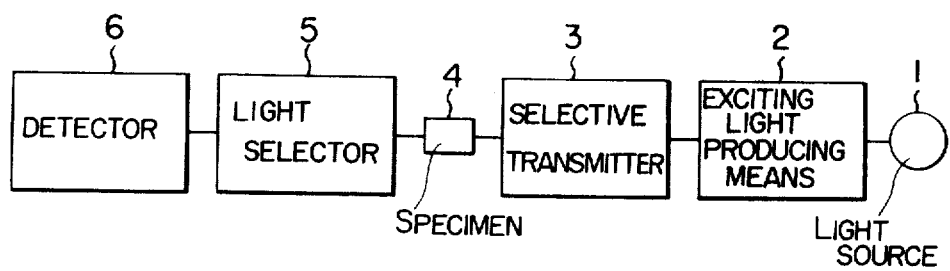
FIG. 1 is a block diagram showing the fundamental construction of the spectrophotofluorometer according to the present invention.

Referring to FIG. 1 the spectrophotofluorometer according to the present invention is composed of a first means 1 for emitting light, a second means 2 for producing exciting light from the light emitted by the light source 1, a third means 3 for selectively transmitting the exciting light from the light exciter 2, a specimen 4 disposed at a position to which the exciting light is directed, a fifth means 5 for selectively transmitting a plurality of secondary light radiations emitted by the specimen 4 due to the exciting light based on the physical and chemical properties or characteristics of the secondary light radiations, and a sixth means 6 for detecting the secondary light radiation selected by the secondary light selector 5.

By the above construction the light emitted by the light source 1 is converted into exciting light by the generator 2 and directed to the specimen 4 through the selective transmitter 3 to excite the specimen 4 to emit a plurality of secondary light radiations. The secondary light radiations are different from each other in their physical and chemical properties or characteristics, so that they can be selected depending on the difference to be subjected to photometry. For example, assume that the specimen emits fluorescence and phosphorescence as secondary light. The lifetime of fluorescence is shorter than that of phosphorescence. Consequently, when it is desired to measure phosphorescence only, the exciting light is directed to the specimen 4 to cause it to emit fluorescence and phosphorescence, and then the exciting light is cut off by the selective transimitter 3, at a time when the fluorescence which is shorter in the lifetime than the phosphorescence has already been extinguished. Thus, the phosphorescence only can be detected by the detector 6 through the secondary light selector 5 which is operated in this case to transmit phosphorescence only. In contrast, when only the fluorescence is desired to be measured, the fluorescence is selected by the secondary light selector 5 depending on the difference in the wavelength. The above-mentioned cutting off of the exciting light by the selective transmitter 3 and the wavelength selection by the secondary light selector 5 can be effected by a single manipulation.

As described above, according to the above construction any of a plurality of secondary light radiations emitted by a specimen can be selectively measured by the use of the difference in the physical and chemical properties or characteristics.

Referring to FIG. 2 which shows in a block form an embodiment of the present invention based on the fundamental construction of FIG. 1, reference numeral 1 designates a light source, reference numeral 3 designates a spectroscope to set the light from the light source 1 at a particular wavelength, and reference numeral 14 designates a chopper as shown in FIGS. 6a and 6b for selectively irradiating a specimen with the exciting light from the spectroscope 3. A specimen 19 is disposed at a position to which the exciting light is selectively directed through the chopper 14. Another chopper 27 which is rotated by a motor 38 synchronously with the chopper 14 transmits selectively the secondary light radiations emitted by the specimen 19 excited by the exciting light based on the physical and chemical properties or characteristics of the secondary light. Another spectroscope 30 performs wavelength selection of the secondary light and a detector 36 detects the selected secondary light radiation. A phase shifter 46 selectively shifts the relative rotary phase angle between the choppers 14 and 27 depending on the physical and chemical properties or characteristics of the secondary light emitted by the specimen 19.

Now the operation of the above arrangement will be described for the case in which the secondary light is fluorescence and phosphorescence. The measurement of fluorescence will first be described.

When the choppers 14 and 27 are of the shape shown in FIGS. 6a and 6b, the choppers 14 and 27 are set by the phase shifter 46 such that their relative rotary phase angle is 90° as shown in FIG. 6a. The light emitted by the light source 1 is made into exciting light of a specified wavelength by the spectroscope 3 and directed to the specimen 19 through the chopper 14. Excited by the exciting light the specimen 19 emits fluorescence and phosphorescence which pass through the chopper 27 because of the relative phase shift 90° of the choppers 14 and 27 to reach the spectroscope 30. The spectroscope 30 performs wavelength selection to pass only fluorescence to the detector 36.

Then, if the choppers 14 and 27 are adjusted so that they become in-phase as shown in FIG. 6b by the phase shifter 46, only phosphorescence is measured. This is because, if the exciting light is directed to the specimen 19 through the chopper 14, the specimen 19 emits fluorescence and phosphorescence, when the chopper 27 is in the state interrupting the optical path to the detector 36, so that neither of the fluorescence and phosphorescence is detected. When the choppers 14 and 27 are rotated by 90° from this state, the reflecting blade of the chopper 14 is at the position indicated by the broken line, so that the exciting light is not reflected by the chopper 14 to the specimen 19. However, since the blade of the chopper 27 is at the position indicated by the broken line at that time, the phosphorescence emitted by the specimen 19 by the previous exciting light is received by the detector 36 through the spectroscope 30 without interrupted by the chopper 27. In this case, since fluorescence emitted by the specimen 19 along with the phosphorescence is shorter in the lifetime than the phosphorescence, it has already been extinguished.

Since, as described above, the relative phase between the choppers can be varied by a single manipulation of the phase shifter, the secondary light emitted by the specimen can be selectively measured by a single manipulation.

The above embodiment is a single beam system. However, for the analysis with higher accuracy and for absorption photometry a double beam system is preferable. An embodiment of the double beam system according to the present invention will next be described referring to FIG. 3.

The light emitted by a light source 1 is received by a first spectroscope (exciting side spectroscope) 3 after being reflected by a mirror 2'. The first spectroscope 3 is composed of an entrance slit 4', a collimator 5', a prism 6' as a disperser, a collimator 7, an intermediate slit 8, a collimator 9, a grating 9 as a disperser, a collimator 11, and an exit slit 12. The light incident upon the prism 6' through the entrance slit 4' and the collimator 5' is dispersed by the prism 6' and at the same time the stray light is removed. Thus, monochromatic light is directed to the grating 10 through the collimator 7, the intermediate slit 8 and the collimator 9. The monochromatic light is further dispersed by the grating 10 and directed toward a mirror 13 as exciting light through the collimator 11 and the exit slit 12. The exciting light is directed to a chopper 14 which is first light beam chopping device. The exciting light is alternately allotted by the chopper 14 to a specimen side optical path 15 and a reference side optical path 16.

The exciting light on the specimen side optical path 15 is directed to a specimen 19 which is a solvent containing a material to be measured through mirrors 17 and 18. Then, the specimen 19 emits fluorescence (including phosphorescence) as specimen light which is directed to a chopper 27 as a second light beam chopping device through mirrors 20 and 21.

On the other hand, the exciting light on the reference side optical path 16 is directed to a solvent 24 which is the same as that of the specimen 19 through mirrors 22 and 23. The reference light from the solvent 24 is directed to the chopper 27 through mirrors 25 and 26. The specimen light and the reference light directed to the chopper 27 are alternately directed toward the same optical path 28 and received by a second spectroscope (fluorescence side spectroscope) 30 through a mirror 29. The spectroscope 30 is to disperse the incident fluorescence to provide monochromatic light and composed of an entrance slit 31, a collimator 32, a grating 33, a collimator 34 and an exit slit 35. The monochromatic light from the second spectroscope 30 is detected by a detector 36.

FIG. 4 is an example of the internal driving mechanism of the optical system of FIG. 3. Reference numeral 38 designates a chopper driving motor for driving the choppers 14 and 27, reference number 39 designates a disc provided with a plurality of slits and rotating synchronously with the choppers 14 and 27, and reference numeral 40 designates a trigger signal generator composed of a light source and a detector which are disposed opposingly to each other at the position of the slit of the disc 39. Reference numeral 41 designates a knob for bringing the trigger signal generator 40 to any position relative to the disc 39, that is, to bring the light source and the detector to any position relative to the slits of the disc 39. Reference numeral 42 designates a motor for rotating the trigger signal generator 40 through an electromagnetic clutch 43. Reference numerals 44 and 45 designate electromagnetic clutches for transmitting and interrupting the torque of the motor 42 to the first and second spectroscopes 3 and 30. Reference numeral 46 designates a chopper phase change-over mechanism for selectively changing the phase relationship between the choppers 14 and 27 depending on the photometric mode.

If the wavelength scanning is performed by connecting the first spectroscope 3 to the motor 42 through the electromagnetic clutch 44 in the state that the electromagnetic clutch 45 is cut off and the second spectroscope 30 is set at a specified wavelength, the excited or emission spectrum can be measured. On the contrary, if the wavelength scanning is performed by connecting the second spectroscope 30 to the motor 42 through the electromagnetic clutch 45 in the state that the electromagnetic clutch 44 is cut off and the first spectroscope 3 is set at a particular wavelength, the measurement of the fluorescence spectrum can be made.

In the latter embodiment, if a difference signal between an electric signal based on the reference light from the solvent 24 arranged on the reference side and an electric signal based on the fluorescence from the sample 19 disposed on the sample side is recorded on a recorder not shown, the fluorescence from the solvent of the sample 19 can be compensated by that from the solvent 24.

A triangular cell 47 filed with Rhodamine B well-known as a photon meter is disposed on the reference side relative to the exciting light as shown in FIG. 5a, and the fluorescence emitted by the Rhodamine B is received by a detector 37 (FIG. 3). By recording the ratio between the output of the detector 37 and the output of the detector 36 based on the fluorescence from the specimen 19 disposed on the sample side on a recorder not shown, the true excited or emission spectrum of the specimen can be provided.

In this case, the phase relationship between the choppers 14 and 27 on the sample side optical path 15 is out of phase by 90° as shown in FIG. 6a.

When the phosphorescence is to be measured, the phase relationship between the choppers 14 and 27 on the sample side optical path 15 is set in phase as shown in FIG. 6b by manipulating the knob of the chopper phase change-over mechanism 46 in FIG. 4. Then, while the specimen 19 is being irradiated with the exciting light from the first spectroscope 3 through the chopper 14, the fluorescence which is shorter in the lifetime than the phosphorescence is made to pass through the chopper 27. In the next rotation state of the choppers 14 and 27 in which the exciting light is being interrupted by the chopper 14, the phosphorescence alone which is longer in the lifetime than the fluorescence and hence is still being emitted by the specimen 19 is reflected by the chopper 27 to be directed to the second spectroscope 30 to be detected by the detector 36. In this case, if the wavelength of the second spectroscope 30 is scanned by the action of the motor 42 through the electromagnetic clutch 45, the phosphorescence spectrum can be obtained.

Further, if the electromagnetic clutches 44 and 45 are cut off from the motor 42 to fix the wavelength of the first and second spectroscopes 3 and 30 and if instead the motion of the motor 42 is transmitted to the trigger signal generator 40 through the electromagnetic clutch 43 to slowly rotate the trigger signal generator 40, the sampling time of the phosphorescence spectrum can be varied, so that an extinction curve of the lifetime of phosphorescence can be obtained on a chart. In this case, of course, the rotary speed of the choppers can be varied depending on the lifetime of the specimen to be measured. For example, at a rotation of 1500 rpm of the chopper driving motor 38 a lifetime of phosphorescence of about 10 milli-seconds can be recorded on a chart.

Also, if a phosphorescence spectrum is measured by setting the trigger signal generator 40 through the knob 41 at a desired slit, a time analyzed spectrum at the time that is a certain time after the interruption of the exciting light can be provided.

If mirrors such as the one 48 shown in FIG. 5b are arranged at the positions of the specimen 19 and the reference side solvent 24 in such a manner as shown in FIG. 5b relative to the exciting light, and if absorption cell holders 19' and 24' are arranged at the positions indicated by the broken lines in FIG. 3, an absorption measurement can be made easily. Also, if the wavelengths of the first and second spectroscopes 3 and 30 are simultaneously scanned by simultaneously activating the electromagnetic clutches 44 and 45, stray light is very much reduced because of the fact that the prism 6' and the gratings 10 and 33 constitute a so-called tripple monochromator having three dispersers, so that the measurement of absorbancy 7 to 8 becomes possible in contrast with the limitation of absorbancy 5 by the conventional auto-recording spectrophotometer. Furthermore, since the light passed the chopper 27 is received by the detector through the spectroscope as contrasted with the conventional spectrophotometer in which the light passed the chopper is received directly by the detector, the true absorption spectrum unaffected by fluorescence can be obtained even if the fluorescence is emitted by the specimen. In addition, since a lamp emitting high intensity continuous light of the wavelength over the range 200 nm to 1000 nm, for example a Xenon lamp is employed as the light source, it is unnecessary to change over two lamps at a certain wavelength as in the conventional spectrophotometer.

As described above, the latter embodiment of the present invention has the following advantages:

1. The influence of the solvent which was a cause of the observational error in a conventional single beam type spectrophotofluorometer is eliminated by employing a double beam system.

2. The measurement of phosphorescence is possible only by changing the positional relationship between choppers by turning the knob of the chopper change-over mechanism without mounting an attachment consisting of a cylindrical chopper and a motor on the sample chamber as in a conventional instrument.

3. By providing a simple structure of trigger signal generator the recording of the lifetime of phosphorescence of the order of milli-second on a chart is possible which was impossible in the past.

4. The measurement of up to absorbancy 8 is possible by employing the structure of a tripple monochromator.

As the method of changing the rotational speed of the choppers various methods are possible. For example, a servo-motor may be used and the voltage therefor may be changed, or a synchronous motor may be used and the gear ratio of the speed change gears may be changed.

What we claim is:

1. A spectrophotofluorometer comprising a light source, a first spectroscope for dispersing light from said light source, a specimen disposed at a position to which exciting light from said first spectroscope is directed, first light beam chopping means arranged between said specimen and said light source for selectively directing exciting light from said first spectroscope to said specimen, a second spectroscope for dispersing secondary light emitted by said specimen due to said exciting light, a detector for detecting the light dispersed by said second spectroscope, second light beam chopping means rotating synchronously with said first light beam chopping means and disposed between said detector and said specimen for selectively directing secondary light emitted by said specimen due to said exciting light to said detector, and a phase variable mechanism for varying the relative rotary phase angle between said first and second light beam chopping means based on the physical and chemical properties of said secondary light emitted by said specimen due to said exciting light.

2. A spectrophotofluorometer comprising a light source, a first spectroscope for dispersing a light beam from said light source, first light beam chopping means for allotting the light beam from said first spectroscope to the specimen side and reference side, second light beam chopping means for alternately directing two light beams allotted by said first light beam chopping means to two optical paths to the same optical path, a second spectroscope for dispersing the light beam from said second light beam chopping means, a detector for detecting the light beam from said second spectroscope, first driving means for driving said first and second spectroscopes, second driving means for synchronously driving said first and second light beam chopping means, and a phase change-over mechanism for selectively changing the relative phase relationship between said first and second light beam chopping means depending on the photometric mode.

3. A spectrophotofluorometer according to claim 2, comprising a clutch mechanism for transmitting the driving force of said first driving means to at least one of said first and second spectroscopes.

4. A spectrophotofluorometer according to claim 2, comprising a disc having a plurality of slits and rotating synchronously with said first and second light beam chopping means, and trigger signal generating means composed of a light source and a detector arranged opposingly to each other at the position of a slit of said disc.

5. A spectrophotofluorometer according to claim 3, comprising a disc having a plurality of slits and rotating synchronously with said first and second light beam chopping means, and trigger signal generating means composed of a light source and a detector arranged opposingly to each other at the position of a slit of said disc.

6. A spectrophotofluorometer comprising a light source, a first spectroscope including two dispersers for dispersing a light beam from said light source, first light beam chopping means for alternately allotting a light beam from said first spectroscope to the specimen side and reference side, second light beam chopping means for alternately directing the two light beams allotted by said first light beam chopping means to the two optical paths to the same optical path, a second spectroscope including a disperser for dispersing the light beam from said second light beam chopping means, detecting means for detecting the light beam from said second spectroscope, first driving means for driving said first and second spectroscopes, second driving means for synchronously driving said first and second light beam chopping means, and a phase change-over mechanism for setting the relative phase relationship between said first and second light beam chopping means at the opposite phase relationship at a first photometric mode and at the in-phase relationship at a second photometric mode.

7. A spectrophotofluorometer according to claim 6, comprising a clutch mechanism for transmitting the driving force of said first driving means to at least one of said first and second spectroscopes.

8. A spectrophotofluorometer according to claim 6, comprising a disc having a plurality of slits and rotating synchronously with said first and second light beam chopping means, and trigger signal generating means composed of a light source and a detector arranged opposingly to each other at the position of a slit of said disc.

9. A spectrophotofluorometer according to claim 7, comprising a disc having a plurality of slits and rotating synchronously with said first and second light beam chopping means, and trigger signal generating means composed of a light source and a detector arranged opposingly to each other at the position of a slit of said disc.

10. A spectrophotofluorometer comprising a Xenon lamp for emitting high intensity continuous light of the wavelength over the range from 200 nm to 1000 nm, a first spectroscope including a prism and a grating for dispersing the light beam from said Xenon lamp, a first chopper for alternately allotting the light beam from said first spectroscope to the specimen side and reference side, a second chopper for alternately directing the light beams allotted by said first chopper to the two optical paths to the same optical path, a second spectroscope including a grating for dispersing the light beam from said second chopper, a detector for detecting the light beam from said second spectroscope, a first motor for driving said first and second spectroscopes, a second motor for synchronously driving said first and second choppers, and a phase change-over knob adapted to set the relative phase relationship between said first and second choppers at the inverse phase relationship at the absorption and fluorescence photometry and at the in-phase relationship at the phosphorescence measurement.

11. A spectrophotofluorometer according to claim 10, comprising an electromagnetic clutch for transmitting the driving force of said first motor to at least one of said first and second spectroscopes.

12. A spectrophotofluorometer according to claim 10, comprising a disc rotating synchronously with said first and second choppers and having a plurality of slits, and a trigger signal generator composed of a light source and a detector arranged opposingly to each other at the position of a slit of said disc.

13. A spectrophotofluorometer according to claim 11, comprising a disc rotating synchronously with said first and second choppers and having a plurality of slits, and a trigger signal generator composed of a light source and a detector arranged opposingly to each other at the position of a slit of said disc.

* * * * *